(12) United States Patent
Ueno

(10) Patent No.: US 7,659,818 B2
(45) Date of Patent: Feb. 9, 2010

(54) BEARING, AND MANAGEMENT SYSTEM AND METHOD FOR THE SAME

(75) Inventor: Hiroshi Ueno, Tondabayashi (JP)

(73) Assignee: JTekt Corporation, Osaka (JP)

( * ) Notice: Subject to any disclaimer, the term of this patent is extended or adjusted under 35 U.S.C. 154(b) by 351 days.

(21) Appl. No.: 10/556,338

(22) PCT Filed: May 13, 2004

(86) PCT No.: PCT/JP2004/006454

§ 371 (c)(1),
(2), (4) Date: Nov. 10, 2005

(87) PCT Pub. No.: WO2004/102018

PCT Pub. Date: Nov. 25, 2004

(65) Prior Publication Data

US 2006/0232425 A1 Oct. 19, 2006

(30) Foreign Application Priority Data

May 13, 2003 (JP) .............................. 2003-134769

(51) Int. Cl.
*G08B 13/14* (2006.01)
*G08B 21/00* (2006.01)
(52) U.S. Cl. .................... 340/572.1; 340/635; 340/447; 340/682; 235/375
(58) Field of Classification Search .................. None
See application file for complete search history.

(56) References Cited

U.S. PATENT DOCUMENTS

| 6,491,440 B1 * | 12/2002 | Sahashi et al. ............... 384/544 |
| 6,501,382 B1 * | 12/2002 | Rehfus et al. ............. 340/572.8 |
| 7,184,930 B2 * | 2/2007 | Miyasaka et al. ........... 702/183 |
| 2002/0054719 A1 | 5/2002 | Takizawa et al. |
| 2002/0186134 A1 | 12/2002 | Rehfus et al. |
| 2003/0030565 A1 * | 2/2003 | Sakatani et al. ............. 340/679 |
| 2005/0073435 A1 * | 4/2005 | Voeller et al. ............... 340/933 |
| 2006/0170551 A1 | 8/2006 | Nakamura et al. |

FOREIGN PATENT DOCUMENTS

| EP | 1 293 766 A1 | 3/2003 |
| JP | 408011028 A * | 1/1996 |
| JP | 2002-349558 A | 12/2002 |
| JP | 2006048373 * | 2/2008 |

\* cited by examiner

*Primary Examiner*—Julie Lieu
(74) *Attorney, Agent, or Firm*—Birch, Stewart, Kolasch & Birch, LLP

(57) ABSTRACT

Installed in a ball bearing which supports a rotation axis (a supported part) freely rotatable are a control unit, a memory unit wherein specified bearing initial information proper to the ball bearing is stored, and a wireless tag equipped with a radio antenna and a transmission/reception unit which transmit/receive information between this memory unit and the exterior. Then, when the bearing motion information on the motion state of said ball bearing is input to the transmission/reception unit, the control unit has a memory unit which stores the motion information. By this, a bearing, its management system, and its management method wherein an appropriate information management is easy can be provided.

22 Claims, 4 Drawing Sheets

BEARING, AND MANAGEMENT SYSTEM AND METHOD FOR THE SAME

FIELD OF TECHNOLOGY

The present invention relates to a bearing such as a rolling bearing which supports a supported part such a rotating body, its management system, and a bearing management method.

BACKGROUND TECHNOLOGY

Bearings such as rolling bearings are integrated in the core part of not only industrial machines such as a steel rolling mill installed in factories, but a variety of apparatuses such as home electric appliances and automobiles used by general users, and support the supported parts such as rotating bodies inside the apparatuses.

However, in a conventional bearing such as the above, information management of the bearing has been insufficient in comparison with its important role.

Specifically, in a conventional bearing in general, with respect to initial products including trial manufactured products, manufacturing factors such as design values and actually-measured values of sections are managed by the bearing manufacturer side as representative values of the bearing. However, with respect to mass-produced products after said trial manufactured product passed an acceptance inspection at the delivering manufacturer (primary user), only marks for specifying its size and the bearing manufacturer are applied, and even said primary user side managed only a small amount of information, such as the manufacturer name and item number of the bearing integrated in the product. Therefore, if a bearing abnormality occurred in the end user of said product, inquiry to the bearing manufacturer etc. took time, and the bearing manufacturer could not deal with the bearing abnormality early enough at times. In this sense, the information management in the conventional bearing was insufficient.

The present invention considers such conventional problems as the above and has an objective of providing a bearing, its management system, and its management method wherein an appropriate information management can be easily performed.

DISCLOSURE OF THE INVENTION

The bearing of the present invention for achieving said objective is characterized by the fact that it is a bearing which supports a supported part, and a wireless tag which transmits/receives information is attached to it.

In a bearing thus constructed, appropriate information management can be easily performed on the corresponding bearing by utilizing said wireless tag.

Also, it is preferred in said bearing that a memory unit be installed in said wireless tag which stores a specified bearing initial information proper to the bearing to which the tag is attached.

In this case, the information proper to the bearing can be instantly obtained by reading out the bearing initial information stored in the memory unit of said wireless tag.

Also, it is preferred in said bearing that said wireless tag be attached to a surface side other than the bearing face which makes a rolling contact, sliding contact, or both contacts with the support face of a supported part.

In this case, said tag can be attached to the bearing in a state wherein the wireless tag is prevented from making contact with the support face, which makes it possible to simplify the process of attaching the tag to the bearing and to prevent the occurrence of tag breakdown caused by contact with the support face.

Also, it is preferred in said bearing that said wireless tag is attached to the fixed side member of the bearing.

In this case, even when the bearing moves, the wireless tag becomes immobile at its attached position, which excludes the influence of the bearing motion to said tag as much as possible and enables easy transmission/reception of information with the tag at its immobile position.

Also, the present invention is characterized by being a management system which manages a bearing, and it is equipped with a measurement mechanism which obtains bearing motion information on the motion state of that bearing when said bearing moves, and a writer which writes the bearing motion information from said measurement mechanism to the memory unit of the wireless tag installed on said bearing.

In a bearing management system thus constructed, because said bearing motion information is obtained by the measurement mechanism and is stored appropriately in the memory unit of said wireless tag by the writer, even when an abnormal motion is performed with the bearing, the abnormal motion can be easily and accurately reproduced by reading out the bearing motion information stored in the memory unit.

Also, the present invention is characterized by being a management method to manage a bearing, bearing motion information on the motion state of said bearing is written to the memory unit of a wireless tag installed on said bearing when the bearing moves, and the written motion information is read out to analyze the motion of said bearing.

In a bearing management method thus constructed, because said bearing motion information is stored appropriately in the memory unit of said wireless tag according to the bearing motion and the bearing motion is analyzed using the stored motion information, even when abnormal bearing motion occurs, that abnormal bearing motion can be easily and accurately reproduced so that an accurate and prompt investigation can be performed on the cause of occurrence of said bearing abnormality to achieve an early resolution of the abnormality.

Also, it is preferred in said bearing management method that the writing action of said bearing motion information in said memory unit be stopped when an occurrence of abnormality is detected in said bearing.

In this case, it becomes possible to securely retain the bearing motion information before and after the occurrence of the bearing abnormality, thus resolution of said bearing abnormality can be performed with certainty.

A figure illustrating the construction of the essential part of a ball bearing and its management system of an embodiment of the present invention.

FIG. 2

Figure 1:
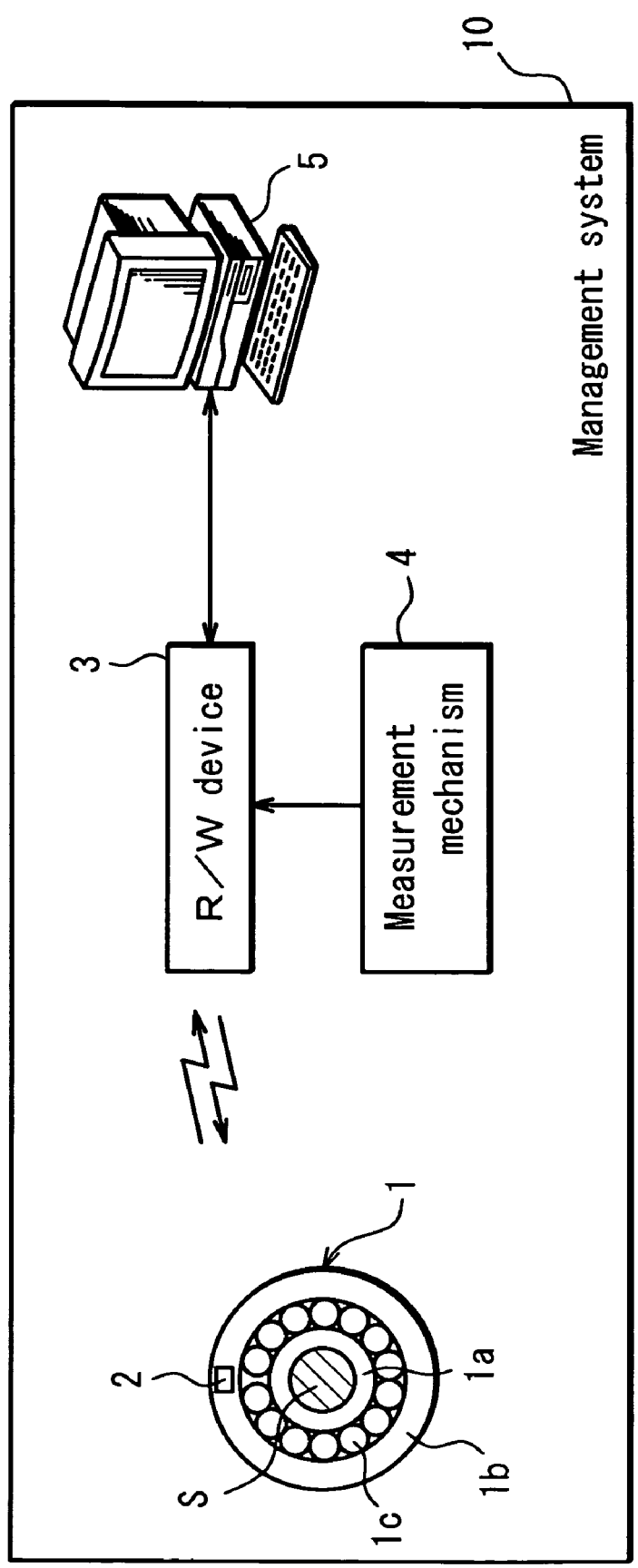
FIG. 1

A block diagram showing a concrete construction example of the wireless tag shown in FIG. 1.

FIG. 3

A cross-sectional view showing the construction of the essential part of a multi-row angular ball bearing of another embodiment.

FIG. 4

Figure 3:
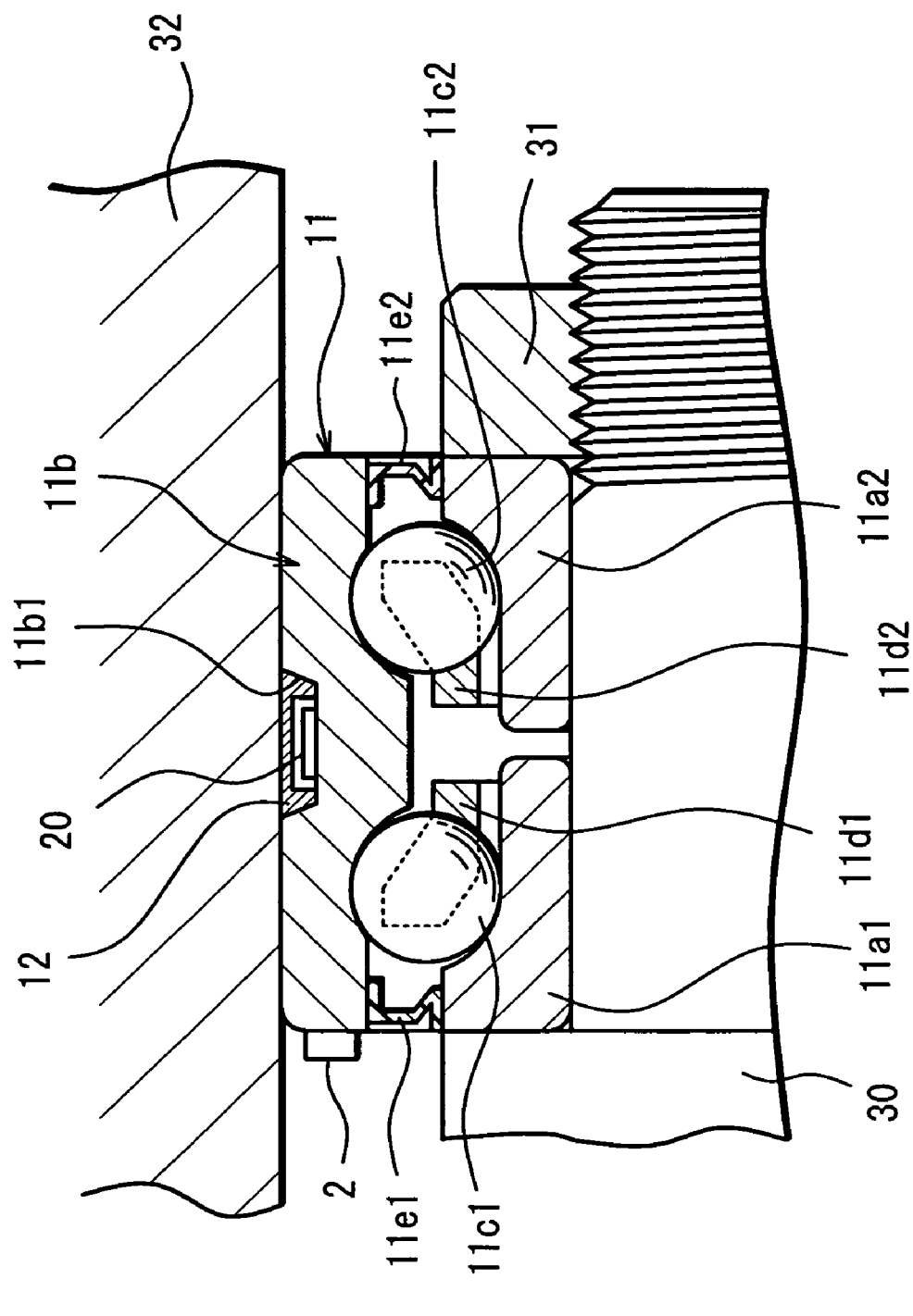

A flow chart showing the method of integrating the ball bearing shown in FIG. 3.

PREFERRED EMBODIMENT OF THE PRESENT INVENTION

Below, preferable embodiments showing the bearing of the present invention, its management system, and its management method are explained referring to the drawings. Note that the explanation below is given by showing the case wherein the present invention is applied to a ball bearing which is integrated in rotating equipment and supports its rotation axis to be freely rotatable.

Embodiment 1

FIG. 1 is a figure illustrating the essential part construction of a ball bearing and its management system of an embodiment of the present invention. In the figure, installed in the management system 10 of the embodiment are a ball bearing 1, which is the subject of management, a wireless tag 2 installed on the ball bearing 1 side, and a reader/writer (R/W) device 3 which can wirelessly perform bidirectional information communication with the tag 2. Also, installed in this system 10 are a measurement mechanism 4 which is connected to the R/W device 3 via a wired or wireless communication path in a information-transmittable way and measures specified actions of the ball bearing 1, and a client terminal 5 comprising a PC (Personal Computer) connected interactively with the R/W device 3 via a communication network such as a LAN. Included in this client terminal 5 are not only the terminals installed in the respective manufacturers of the ball bearing 1 and the rotating equipment but also the terminals installed in the user side who uses said equipment, so that instructions, display, etc. of information written to the wireless tag 2 or read from the tag 2 via the R/W device 3 can be performed on the respective manufacturer side and user side.

Said ball bearing 1 is equipped with an inner ring 1a as a rotating ring attached to the rotation axis S of said rotating equipment as one unit, an outer ring 1b as a fixed ring attached to the housing etc. of said equipment, and balls 1c arranged freely rollable between the inner and outer rings, and supports the rotating axis S to be freely rotatable. Also, said outer ring 1b has its outer circumference contact with the attaching face of said housing, etc., and its axis-directional end face fixed with a rotating equipment side member etc. in a non-contacting state.

Said wireless tag 2 is attached to the axis-direction end face of said outer ring 1b which is a fixed-side member, and is constructed as an RFID (Radio Frequency Identification) tag which retains and manages information on the ball bearing 1. Also, as the information managed by the wireless tag 2 there are specified bearing initial information proper to the ball bearing 1 and bearing motion information concerning the motion state of said bearing 1 which is added appropriately according to the motion of this ball bearing 1 (the details will be described later).

Figure 2:
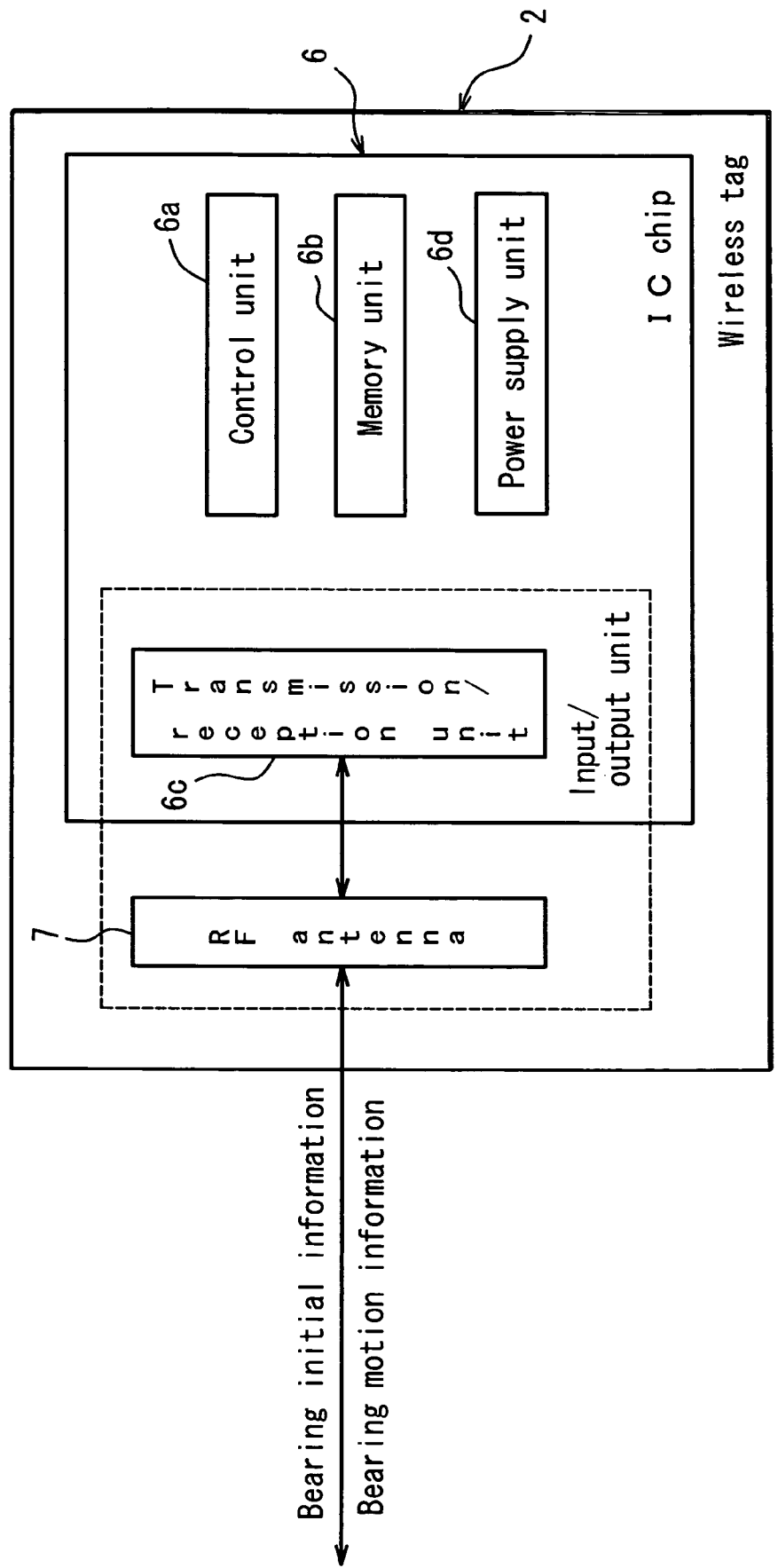

More concretely, also referring to FIG. 2, said wireless tag 2 is equipped with an IC chip 6 constructed using a semiconductor chip and an RF antenna 7 which has an iron core and an antenna coil rolled on it and performs transmission/reception of radio wave, and is constructed in a one-chip wherein these chip 6 and antenna 7 are attached on a substrate. Also, the wireless tag 2 is attached to the axis-direction end face of the outer ring 1b with said substrate contained in a protective case made of metal or synthetic resin. Also, the wireless tag 2 is constructed to be extremely light in weight and compact having its length and width of about 0.3~0.4 mm, and said tag 2 is attached to the ball bearing 1 by fixing that case to said end face with an adhesive, etc. Furthermore, it is preferred to form an attaching section such as a concave section on said axis-direction end face or the outer circumference face and contain the wireless tag 2 inside the attaching section so that it will not go out of this attaching section. If thus configured, the tag 2 can be securely prevented from coming out of the outer ring 1b or from developing a breakdown by contacting with a equipment-side member during the work of attaching the ball bearing 1 to a rotating equipment.

Installed in said IC chip 6 are a control unit 6a formed including a computing means such as a CPU, a memory unit 6b which is constructed as nonvolatile memory and performs writing and reading of data according to instructions from the control unit 6a, and a transmission/reception unit 6c which constitutes an input/output unit which is connected to said RF antenna 7 and inputs/outputs information between said memory unit 6b and the exterior in cooperation with this antenna 7 and is controlled by the control unit 6a.

Also, the IC chip 6 is equipped with a power supply unit 6d which has a capacitor which is connected to said antenna coil and constitutes a resonating circuit together with this coil. This power supply unit 6d is constructed so that the capacitor is charged when said RF antenna receives a radio wave of a specified (resonance) frequency and the charged electric power is supplied to sections of said chip 6, wherein the wireless tag 2 functions as a batteryless information management tool.

Said control unit 6a is constructed so as to perform driving control of a modulation circuit and a demodulation circuit included in the transmission/reception unit 6c and manages the memory region inside the memory unit 6b.

Specifically, when the RF antenna 7 receives a transmission wave from said R/W device 3, the control unit 6a obtains information contained in the transmission wave from the transmission/reception unit 6c by operating said demodulation circuit. Included in this information is an identification code for identifying the ball bearing 1, and the control unit 6a judges whether the received transmission wave was sent to said bearing 1 or not. If the control unit 6a has judged that it is a transmission wave to be sent to said bearing 1, the control unit 6a makes a judgment on whether the instruction contained in that transmission wave is a write instruction or a read instruction.

Subsequently, if the instruction received this time is a write instruction, the control unit 6a has the transmission information sent with the instruction stored in a specified region of the memory unit 6b according to the content of that transmission information, etc.

Also, if the instruction received at this time is a read out instruction, the control unit 6a reads out information specified by that instruction from a memory region of the memory unit 6b and has the read-out information including said identification code modulated in a transmission wave to be sent to the R/W device 3 by operating the modulation circuit of the transmission/reception unit 6c and has it transmitted via the RF antenna 7.

Stored in said memory unit 6b is said bearing initial information before, for example, the factory ship-out of the ball bearing 1. This bearing initial information is specific data on manufacturing factors of the ball bearing 1, and the initial information includes manufacturing history data such as design values and actually-measured values of components of the ball bearing 1, namely the inner and outer rings 1a and 1b and the balls 1c, and initial values of assembly precisions, manufacture numbers, etc. of these elements, or basic data such as the kind and quantity of lubricating oil between the inner and outer rings 1a and 1b.

Specifically, the bearing initial information is largely categorized into basic information and additional information as listed in the following Table 1. Said basic information is basic and fixed information on the ball bearing 1 to which the wireless tag 2 is attached, and included in this basic information are component information divided into the components of said ball bearing 1 for example and whole information on the whole of the ball bearing 1. Also, the additional information is information which is added appropriately by requests from the user side or service, etc. by the bearing manufacturer side, and included in this additional information are guidance information and remarks information for example.

TABLE 1

Bearing initial information

| Basic information | Additional information |
|---|---|
| Component information | Guidance information |
| Whole information | Remarks information |

Specifically, the component information comprises the basic data on the components of the ball bearing 1, being data on such as design values, actually-measured values, manufacture numbers, and materials of said inner and outer rings 1a and 1b and balls 1c. Also, included in the component information are, in addition to data showing the kind and quantity of said lubricating oil such as grease, data on a sealing member which seals a ring-shape opening between the inner and outer rings 1a and 1b and a retainer which retains multiple balls 1c with an equal interval in the same way as said data on balls 1c, etc.

Also, the whole information comprises basic data on the completed product of the ball bearing 1, and included in this whole information are dimension data such as bearing width and spaces at the time of manufacturing. Also, data showing the use conditions of the ball bearing 1 such as allowable temperature and allowable load are also stored in the memory unit 6b as the whole information.

Because the memory unit 6b retains the bearing initial information including such component information and whole information as the above, not only the bearing manufacturer but also the primary user who integrated the ball bearing 1 in a product and the final user who purchased said product can immediately know the information proper to said ball bearing 1. Furthermore, even information which is difficult to judge from the external appearance of the ball bearing 1, for example the information showing the composition of the material of said sealing member, can be easily obtained. Also, among different kinds of grease used according to the use temperature of the ball bearing 1, an appropriate grease can be easily selected for its use temperature.

Said guidance information is data such as guidance concerning the ball bearing 1 and said rotating equipment in which this is integrated, and included in this information are data on the assembly standard of said ball bearing 1 used in the manufacturing line of the user side for example. Namely, a procedure necessary for the work of assembling the ball bearing 1 into rotating equipment, appropriate assembly data values such as tightening torque, press-fitting load, thrust or radial preload of the ball bearing 1, and data showing the assembly positions related to the design drawing of the rotating equipment are stored in the memory unit 6b as the guidance information. Also, included in this guidance information are data showing troubleshooting methods in case abnormal operations occur in the ball bearing 1 and rotating equipment.

Said remarks information is data such as special remarks and precautions on the ball bearing 1 and said rotating equipment, the information including data on mill sheet (steel inspection certificate) of the inner and outer rings 1a and 1b and balls 1c that the bearing manufacturer obtained from the steel maker. Also, if said sealing member is constructed of synthetic resin, usage contents such as the quantity (usage ratio) of recycled part in that sealing member, namely the synthetic resin re-used (re-synthesized) and the resin name are stored as the remarks information. Also, depending on the performance and material of the ball bearing 1, stored as the remarks information are data showing that this ball bearing 1 is an export restricted item such as materials subject to the security trade control or data showing that it contains environmentally hazardous substances. Also, if data showing contact information such as the bearing manufacturer and user (primary user) are retained in the memory unit 6b as the remarks information, when trouble has occurred with the ball bearing 1 or rotating equipment, it can be immediately reported to the manufacturer.

Also, said bearing motion information which is stored appropriately in the memory unit 6b is data which varies according to the actual motion state of the ball bearing 1, and this motion information includes motion data measured by the measurement mechanism 4 such as temperature, vibration value, or noise value around the ball bearing 1, or the number of rotation of the rotation axis S (ball bearing 1) with which the bearing motion can be analyzed. Note that this motion data are updated successively according to the storage capacity of the memory unit 6b, and the memory unit 6b is designed to hold at least the most recent motion data. Specifically, in the memory unit 6b a memory region of a specified data size is assigned to the motion data of the bearing motion information, and the memory unit 6b is constructed so that it updates said motion data from the data of the oldest storing date. Also, this memory unit 6b is constructed to stop bearing motion information update (write) operation according to the instruction from the control unit 6a, wherein, when the client terminal 5 detects an abnormality in the ball bearing 1 based on the measurement data of the measurement mechanism 4, bearing motion information write operation is stopped by sending a stop writing instruction from this terminal 5 to the control unit 6a. Because bearing motion information write operation in the memory unit 6b is stopped when an abnormality is thus detected in the ball bearing 1, it becomes possible to retain the bearing motion information before and after the occurrence of the bearing abnormality securely in the memory unit 6b.

Returning to FIG. 1, said R/W device 3 contains an antenna which performs wireless communication with the RF antenna 7 of the wireless tag 2, wherein the R/W device 3 exchanges data with the wireless tag 2 responding to the direct operation by the operator or the remote operation using the client terminal 5 to said device 3. Also, installed in this R/W device 3 is a display which can display said identification code, write data, read data, etc. so that the operator can immediately grasp data read from the wireless tag 2 and visually perceive data written from the measurement mechanism 4 to the tag 2. Furthermore, preferably used as the R/W device 3 is a handy-type one constructed freely portable by the operator, to read and write bearing initial information or bearing motion information for multiple ball bearings 1.

Said measurement mechanism 4 is equipped with a detection means for acquiring said bearing motion information, specifically measurement instruments such as a temperature meter, a vibrometer, a noise meter, or a tachometer. These measurement instruments detect each corresponding motion data at each specified sampling cycle and output them to the R/W device 3. Also, as said measurement instruments those installed independently from said rotating equipment and those installed as default in said equipment for controlling the rotating equipment can be used. Also, as the measurement instruments, not only those which directly measure data such as temperature but also an ammeter which measures the supplied electric current value to an electric motor which drives the rotation axis S can be used for example, and those which indirectly measure data on the number of rotation based on the detected value of this ammeter can be also used.

In this embodiment constructed in the above way, when the ball bearing 1 operates, the measurement mechanism 4 acquires said bearing motion information, and the R/W device 3 has the bearing motion information from the measurement mechanism 4 stored in the memory unit 6b of the wireless tag 2. Also, because said bearing initial information is stored in the memory unit 6b, even when an abnormality occurs to the ball bearing 1 due to long-term changes or an inappropriate operation, by reading the bearing initial information and bearing motion information stored in the memory unit 6b, that abnormal action can be easily and precisely analyzed and reproduced to perform a verification test. As this result, it becomes possible to resolve the cause of said bearing abnormality precisely and early, and an early resolution of the bearing abnormality can be achieved. Also, because the most recent bearing motion information is stored in the memory unit 6b, it becomes possible by using these most recent motion data to warn the operator before an abnormality occurs to the ball bearing 1 and to also prevent bearing abnormality. Also, because information is read from or written to the memory unit 6b of the tag 2 through wireless communication between the wireless tag 2 and the R/W device 3, information management of the ball bearing 1 integrated inside rotating equipment can be securely performed without disassembling said equipment.

Also, in this embodiment, because the wireless tag 2 is attached to the axis-direction end face of the outer ring 1b, said tag 2 is attached to a face other than the track face (bearing face) where said balls 1c roll, and the tag 2 is attached to the ball bearing 1 in a state where contact with the outer face (support face) of the rotation axis (a supported part) S is prevented to simplify attaching a tag to the ball bearing 1. Furthermore, because contact between the wireless tag 2 and said support face is prevented, occurrence of tag breakdown due to its contact can be prevented.

Also, because the wireless tag 2 is attached to the outer ring 1b which is a fixed member of the ball bearing 1, this tag 2 ends up fixed to the attached position inside the rotating equipment, thus influences of bearing rotation motion on said tag 2 is excluded as much as possible, and even when using a small-output R/W device 3 having a narrow transmission/reception range of radio wave, wireless communication between this device 3 and the tag 2 can be easily performed.

Furthermore, because the wireless tag 2 is attached to the ball bearing 1 itself, even when the ball bearing 1 is detached from the rotating equipment and used in another machine, the wireless tag 2 can be moved together with the ball bearing 1. Hence, the bearing initial information and bearing motion information stored in said memory unit 6b can be moved together with said ball bearing 1, always utilizing its bearing initial information and the accumulated bearing motion information effectively. Also, because the bearing information can be moved together with the ball bearing 1 in this way, different from the case wherein bearing information is recorded and managed by recording it on a form (e.g., an inspection score sheet), misplacement and loss of the bearing information can be prevented, and further there is no need to separately secure a place to store bearing information.

Embodiment 2

FIG. 3 is a cross-sectional view showing the essential part construction of multi-row angular ball bearing of another embodiment. In the figure, the main difference between this embodiment and said embodiment is that the application is to a multi-row angular ball bearing used in automobile wheel hubs.

In FIG. 3, the multi-row angular ball bearing 11 of this embodiment is equipped with a pair of inner rings 11a1 and 11a2 which are divided in two along the axis, and a single outer ring 11b whose whole is formed as one unit. Also, installed in this ball bearing 11 are multiple balls 11c1 arranged freely rollable between the inner ring 11a1 and the outer ring 11b, and multiple balls 11c2 arranged freely rollable between the inner rign 11a2 and the outer ring 11b. These balls 11c1 and 11c2 roll on the corresponding track surfaces of the inner and outer rings in a state wherein they are retained at a specified interval by retainers 11d1 and 11d2. Also, installed in a ring-shape opening between said inner ring 11a1 and outer ring 11b is a sealing member 11e1 made of synthetic resin. Similarly, installed in a ring-shape opening between the inner ring 11a2 and outer ring 11b is a sealing member 11e2 made of synthetic resin, preventing rainwater, foreign materials, etc. from invading the bearing interior together with said sealing member 11e1.

Said inner rings 11a1 and 11a2 are assembled as one unit with the axle (a supported part) 30 of said automobile tires so that they function as rotating rings. Specifically, in one inner ring 11a1, said inner ring 11a1 is attached to the axle 30 in a state wherein its axis-direction end face is in contact with a flange section of one end side of the axle 30. Also, in the other inner ring 11a2, said inner ring 11a2 is attached to the axle 30 in a state wherein its axis-direction end face is in contact with a nut 31 screwed to the screw section of the other end side of the axle 30. By adjusting the tightening force to this nut 31, a specified (thrust) preload is applied to the ball bearing 11 (the details will be described later).

Said outer ring 11b functions as a fixed ring, fixed as one unit to the automobile-side housing (to be more detailed, a tube section of said wheel) 32. Also, this outer ring 11b has a cut-out section 11b1 formed on a part of its outer circumference. Installed on this cut-out section 11b1 is a load sensor, such as a distortion gauge 20 for example, for measuring said preload applied to the ball bearing 11. Also attached to the cut-out section 11b1 is a metallic cover 12, designed to protect the distortion gauge 20.

Also, installed on the axis-direction end face of the outer ring 11b is said wireless tag 2, constructed so that bi-directional communication with the R/W device 3 can be performed. Note that it may be such a construction that instead of said cut-out section 11b1, a surrounding groove is formed all around the outer circumference of the outer ring 11b, the distortion gauge 20 is installed in said surrounding groove, and further the wireless tag 2 is installed.

Also, connected to the wireless tag 2 distortion gauge 20 via a signal line which is omitted in the figure, wherein the detection results of this gauge 12 are transmitted to the R/W device 3 (FIG. 1). Specifically, installed in said transmission/reception unit 6c (FIG. 2) is an interface unit to which the detected signal from the distortion gauge 20 can be inputted, and said detected signal in the analog format is converted into a digital signal in the digital format in this interface unit. Then, the control unit 6a (FIG. 2) stores said data signal showing the detected preload value as bearing motion information in the memory unit 6b (FIG. 2) and has the transmission/reception unit 6c forward it to the client terminal 5 (FIG. 1) via the R/W device 3.

Also, information such as gauge property proper to the distortion gauge 20 necessary for integrating the ball bearing 11 (namely, said assembly standard) is pre-stored in said memory unit 6b as the guidance information of said additional information. Specifically, the distortion gauge 20 has delicately different output characteristics (gauge properties) depending on the actually attached position to said cut-out section 11b1, the attaching accuracy such as attaching strength, or the sensor characteristic of the gauge itself. In order to monitor detection signals of multiple distortion gauges 12 with the same monitor, gain adjustment of the amplifying circuit which amplifies its signal output needs to be performed. Because the gauge property of the distortion gauge 20 attached to the ball bearing 11 thus varies from one bearing to another, the bearing manufacturer side grasps the optimal gauge property on the automobile manufacturer side monitor before the factory shipment and stores that grasped gauge property in the memory unit 6b as additional information in advance.

Figure 4:
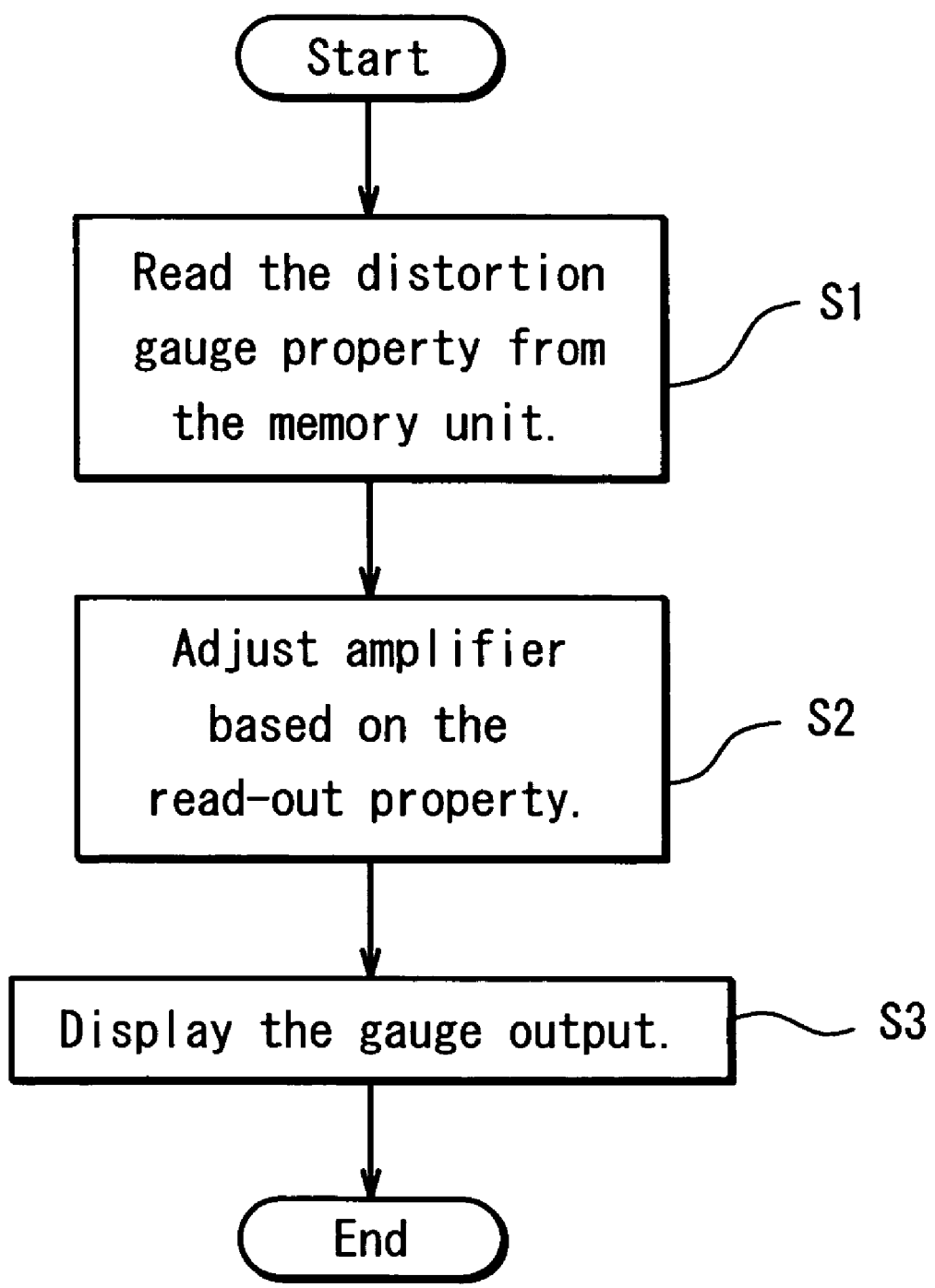

Specific actions in this embodiment are explained hereafter, with reference to FIG. 4. Note that in the following explanation the assembly process for integrating the ball bearing 11 into the automobile side is mainly explained.

As shown in FIG. 3, once the inner rings 11a1 and 11a2 and the outer ring 11b of the ball bearing 11 are tentatively assembled to the axle 30 and the housing 32, respectively, as shown in Step S1 in FIG. 4, a worker has the R/W device 3 read out guidance information including the gauge property of the distortion gauge 20 stored in the memory unit 6b and has it transferred to the client terminal 5. Installed in this client terminal 5 is said amplifying circuit functionally with software for example, and in this terminal 5 a gain value included in the transferred gauge property is extracted. Then, in the amplifying circuit of this client terminal 5, optimal gain adjustment is performed for the distortion gauge 20 installed on the ball bearing 11 (Step S2).

Afterwards, in the client terminal 5, detected signals of the distortion gauge 20 sent out via the wireless tag 2 and the R/W device 3 are input and amplified in said amplifying circuit, and then displayed on the display (Step S3). Then, the worker adjusts the tightening force to said nut 31 so that the specified preload is applied to the ball bearing 11 while checking the display to integrate said ball bearing 11.

As in the above, in this embodiment, because the memory unit 6b stores as the additional information the gauge property etc. of the distortion gauge 20 attached to the ball bearing 11, it becomes possible to integrate the ball bearing 11 easily and precisely to the specified preload without performing amplifier adjustment in the automobile manufacturer side.

Whereas in the explanations in said Embodiment 1 and Embodiment 2 cases of applying to a ball bearing which supports freely rotatable the rotation axis S of rotating equipment and a multiple-row angular ball bearing integrated in an automobile wheel hub are explained, the present invention may be anything wherein a wireless tag which can send and receive information is installed on a bearing which supports a supported part, and its bearing form and supported part are not limited at all to those in the above. Specifically, it can be applied to various kinds of bearings such as rolling bearings such as roller bearing, conic roller bearing, and needle roller bearing, sliding bearings, and linear motion bearings which support a linearly moving supported part with a rolling or sliding contact. Also, it can be applied to a dynamic load bearing wherein a dynamic load generating groove is formed on one side.

Also, whereas in the above explanation a management system use of an R/W device was explained, the management system of the present invention may be anything which can write said bearing motion information appropriately to the memory unit according to the bearing motion, wherein the R/W device may be replaced with a writer device.

Also, whereas explained in the explanation of said Embodiment 1 was a construction wherein validation test is performed using the bearing initial information and bearing motion information stored in the memory unit when an abnormality occurs, the present invention is not limited to this. For example, it may have a construction wherein conditions (such as usage temperature and time) necessary for judging the degradation of said grease are included in the bearing initial information and pre-stored in the memory unit, and the control unit utilizes these conditions and data such as temperature detected by a temperature sensor installed outside the bearing or directly on the bearing to judge the degree of degradation of said grease. Namely, by utilizing the control unit and the memory unit of the wireless tag, a bearing having a self-diagnosis function can also be constructed and managed.

Also, whereas explained in the explanation of said Embodiment 1 was construction wherein the bearing motion information write operation in the memory unit is stopped when the client terminal has detected an abnormality in the ball bearing based on the measurement data of the measurement mechanism, the present invention is not limited to this, but the control unit of the wireless tag may be given an abnormality detection function based on said measurement data and the bearing motion information write operation may be stopped according to the abnormality detection result in this control unit.

Also, whereas construction was in the explanation of said Embodiment 2 in which the wireless tag and the distortion gauge are connected, the wireless tag converts the detected analog signal into digital data and send it to the client terminal side, the present invention is not limited to this but may have a construction wherein a separate transmitter is installed to analog-transmit the detected signal from the distortion gauge.

What is claimed is:

1. A bearing system comprising:
   a bearing which supports a supported part;
   a wireless tag which transmits/receives information is attached to the bearing, the wireless tag including a memory unit, and bearing motion information on a motion state of said beating being writable to the memory unit when the bearing moves, wherein the memory unit stores specified bearing initial information proper to the bearing;
   a measurement mechanism which obtains the bearing motion information on the motion state of the bearing when the bearing moves; and
   a writer which writes the bearing motion information from the measurement mechanism to the memory unit.

2. The bearing described in claim 1, wherein said wireless tag is attached to a surface side other than the bearing face which makes a contact including a rolling contact, sliding contact, or both to the support face of the supported part.

3. The bearing described in claim 1, wherein said wireless tag is attached to a fixed-side member of the bearing.

4. A bearing management system characterized by being a management system to manage a bearing, it is equipped with a measurement mechanism which obtains bearing motion information on the motion state of the bearing when said bearing moves, and a writer which writes the bearing motion information from said measurement mechanism to a memory unit of the wireless tag installed on said bearing, wherein the memory unit stores specified bearing initial information proper to the bearing.

5. A bearing management method characterized by being a management method to manage a bearing, by which bearing motion information on the motion state of said bearing is written to a memory unit of a wireless tag installed on said bearing when the bearing moves, and the written motion information is read out to analyze the motion of said bearing, wherein the memory unit stores specified bearing initial information proper to the bearing.

6. A bearing management method characterized by being a management method to manage a bearing, by which bearing motion information on the motion state of said bearing is written to a memory unit of a wireless tag installed on said bearing when the bearing moves, and the written motion information is read out to analyze the motion of said bearing, wherein when an abnormality is detected in said bearing, write operation of said bearing motion information in said memory unit is stopped.

7. The bearing described in claim 1, wherein said wireless tag is attached to a surface side other than the bearing face which makes a contact including a rolling contact, sliding contact, or both to the support face of the supported part.

8. The bearing described in claim 1, wherein said wireless tag is attached to a fixed-side member of the bearing.

9. The bearing described in claim 2, wherein said wireless tag is attached to a fixed-side member of the bearing.

10. A bearing system comprising:
a bearing which supports a supported part;
a wireless tan which transmits/receives information is attached to the bearing, the wireless tan including a memory unit, and bearing motion information on a motion state of said bearing being writable to the memory unit when the bearing moves;
a measurement mechanism which obtains the bearing motion information on the motion state of the bearing when the bearing moves; and
a writer which writes the bearing motion information from the measurement mechanism to the memory unit,
wherein when an abnormality is detected in said bearing, the memory unit stops storing the bearing motion information on the motion state of the bearing.

11. The bearing system described in claim 1, further comprising a reader to read out the bearing motion information stored in the memory unit so as to analyze the motion of the bearing.

12. A bearing system comprising:
a bearing which supports a supported part;
a wireless tag which transmits/receives information is attached to the bearing, the wireless tag including a memory unit, and bearing motion information on a motion state of said bearing being writable to the memory unit when the bearing moves, wherein the memory unit stores specified bearing initial information proper to the bearing;
a reader which reads out the bearing motion information stored in the memory unit so as to analyze the motion of the bearing.

13. A bearing system comprising:
a bearing which supports a supported part;
a wireless tag which transmits/receives information is attached to the bearing, the wireless tag including a memory unit, and bearing motion information on a motion state of said bearing being writable to the memory unit when the bearing moves;
a reader which reads out the bearing motion information stored in the memory unit so as to analyze the motion of the bearing,
wherein when an abnormality is detected in said bearing, the memory unit stops storing the bearing motion information on the motion state of the bearing.

14. The bearing management system of claim 4, further comprising a reader which reads out the bearing motion information stored in the memory unit so as to analyze the motion of the bearing.

15. A bearing management system characterized by being a management system to manage a bearing, it is equipped with a measurement mechanism which obtains bearing motion information on the motion state of the bearing when said bearing moves, and a writer which writes the bearing motion information from said measurement mechanism to the memory unit of the wireless tag installed on said bearing,
wherein when an abnormality is detected in said bearing, the memory unit stops storing the bearing motion information on the motion state of the bearing.

16. A bearing for a wheel hub in an automobile, comprising:
an outer ring having a cut-out section formed on an outer circumference for fitting on a housing of the automobile;
an inner ring for fitting on an axle;
a plurality of balls arranged between the outer ring and the inner ring;
a distortion gauge mounted to the cut-out section of the outer ring, for measuring a preload applied to the bearing; and
a wireless tag installed on the bearing having a memory unit storing output characteristics of the distortion gauge by receiving detection results of the distortion gauge and storing specified bearing initial information proper to the bearing.

17. A bearing management system using the bearing of claim 16, comprising a client terminal having an amplifying circuit wherein gain adjustment is performed by receiving the output characteristics stored in the wireless tag.

18. The bearing system of claim 1, wherein guidance information for assembly in a manufacturing line is stored in the memory unit.

19. The bearing system of claim 1, wherein remarks information includes special remarks and precautions on the bearing and a rotating equipment is stored in the memory unit.

20. The bearing system of claim 19, wherein the remarks information relates to recycled parts.

21. The bearing system of claim 19, wherein the remarks information relates to export restricted items.

22. The bearing system of claim 19, wherein the remarks information relates to environmentally hazardous substances.

* * * * *